(12) United States Patent
Lancaster

(10) Patent No.: US 9,197,062 B2
(45) Date of Patent: Nov. 24, 2015

(54) REMOTE DISCONNECT SAFETY MECHANISM

(71) Applicant: Itron, Inc., Liberty Lake, WA (US)

(72) Inventor: Andrew Lancaster, Seneca, SC (US)

(73) Assignee: Itron, Inc., Liberty Lake, WA (US)

( * ) Notice: Subject to any disclaimer, the term of this patent is extended or adjusted under 35 U.S.C. 154(b) by 478 days.

(21) Appl. No.: 13/717,468

(22) Filed: Dec. 17, 2012

(65) Prior Publication Data

US 2014/0167528 A1   Jun. 19, 2014

(51) Int. Cl.
*H01H 31/04* (2006.01)
*H02H 11/00* (2006.01)
*G01D 4/04* (2006.01)

(52) U.S. Cl.
CPC ............... *H02H 11/008* (2013.01); *G01D 4/04* (2013.01); *Y02B 90/246* (2013.01); *Y04S 20/42* (2013.01); *Y10T 307/826* (2015.04); *Y10T 307/858* (2015.04)

(58) Field of Classification Search
USPC ......................................................... 307/130
See application file for complete search history.

(56) References Cited

U.S. PATENT DOCUMENTS

| 4,700,188 | A | * | 10/1987 | James | G01R 21/08 324/110 |
|---|---|---|---|---|---|
| 5,696,695 | A | | 12/1997 | Ehlers et al. | |
| 5,940,009 | A | | 8/1999 | Loy et al. | |
| 6,429,674 | B1 | * | 8/2002 | Barth | G01R 31/001 324/676 |
| 8,947,194 | B2 | * | 2/2015 | Sella | G08B 13/1409 136/244 |
| 2006/0091877 | A1 | * | 5/2006 | Robinson | G01R 21/133 324/76.11 |
| 2006/0271314 | A1 | * | 11/2006 | Hayes | G01D 4/002 702/62 |
| 2008/0100248 | A1 | * | 5/2008 | Filippenko | H02J 9/061 318/466 |
| 2008/0204953 | A1 | | 8/2008 | Shuey | |
| 2008/0258709 | A1 | | 10/2008 | Shuey | |
| 2009/0243866 | A1 | * | 10/2009 | Murphy | G06Q 50/06 340/635 |
| 2011/0074603 | A1 | * | 3/2011 | Cornwall et al. | 340/870.03 |
| 2012/0053472 | A1 | * | 3/2012 | Tran | 600/509 |
| 2013/0002368 | A1 | * | 1/2013 | Zhu | H03H 7/40 333/32 |
| 2014/0167528 | A1 | * | 6/2014 | Lancaster | H02H 11/008 307/130 |

FOREIGN PATENT DOCUMENTS

EP         2456084 A1    5/2012
WO    WO2008030416 A2    3/2008

OTHER PUBLICATIONS

PCT Search Report and Written Opinion mailed Jan. 21, 2014 for PCT Application # PCT/US13/67331, 10 pages.

* cited by examiner

*Primary Examiner* — Ronald W Leja
(74) *Attorney, Agent, or Firm* — Lee & Hayes, PLLC

(57) ABSTRACT

Electricity service may be safely remotely connected to a site by a network computing device, such as an electricity meter, even when the network computing device is not accessible at the site. The network computing device may include a service switch capable of connecting electricity service to a site, a communication module capable of receiving commands to connect or disconnect electricity service, and a safety mechanism to monitor a circuit internal to the site and to prevent the service switch from connecting electricity service to the site while a potentially unsafe condition is detected.

20 Claims, 4 Drawing Sheets

REMOTE DISCONNECT SAFETY MECHANISM

BACKGROUND

Electricity meters provide a mechanism for utility companies to measure electricity consumption at a residence, business, facility, or other site. Such electricity meters often contain a service switch to connect or disconnect electricity service to the respective site. Some electricity meters are equipped with two-way communication technologies that allow utility companies to remotely connect or disconnect power via the service switch in the meter.

Utility companies can remotely disconnect electricity service to the site substantially without risk of harm. However, remotely reconnecting electricity service to a site presents various safety hazards. For example, someone could be currently working on electrical wiring and could be electrocuted if the electricity service were turned back on unexpectedly. As another example, an appliance at the site such as a stove could be turned on potentially resulting in a fire if combustible material were sitting on top of the stove. Thus, utility companies need some way to make sure that it is safe to turn electricity service back on.

In the past, utility companies have dealt with this need by requiring a person (e.g., a resident or employee) at the site to press a button on the meter to reconnect service. However, this approach only works if the person at the site has ready access to the meter. If a meter is not readily accessible, there has not previously been a way for utility companies to safely remotely reconnect electricity service to the site.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
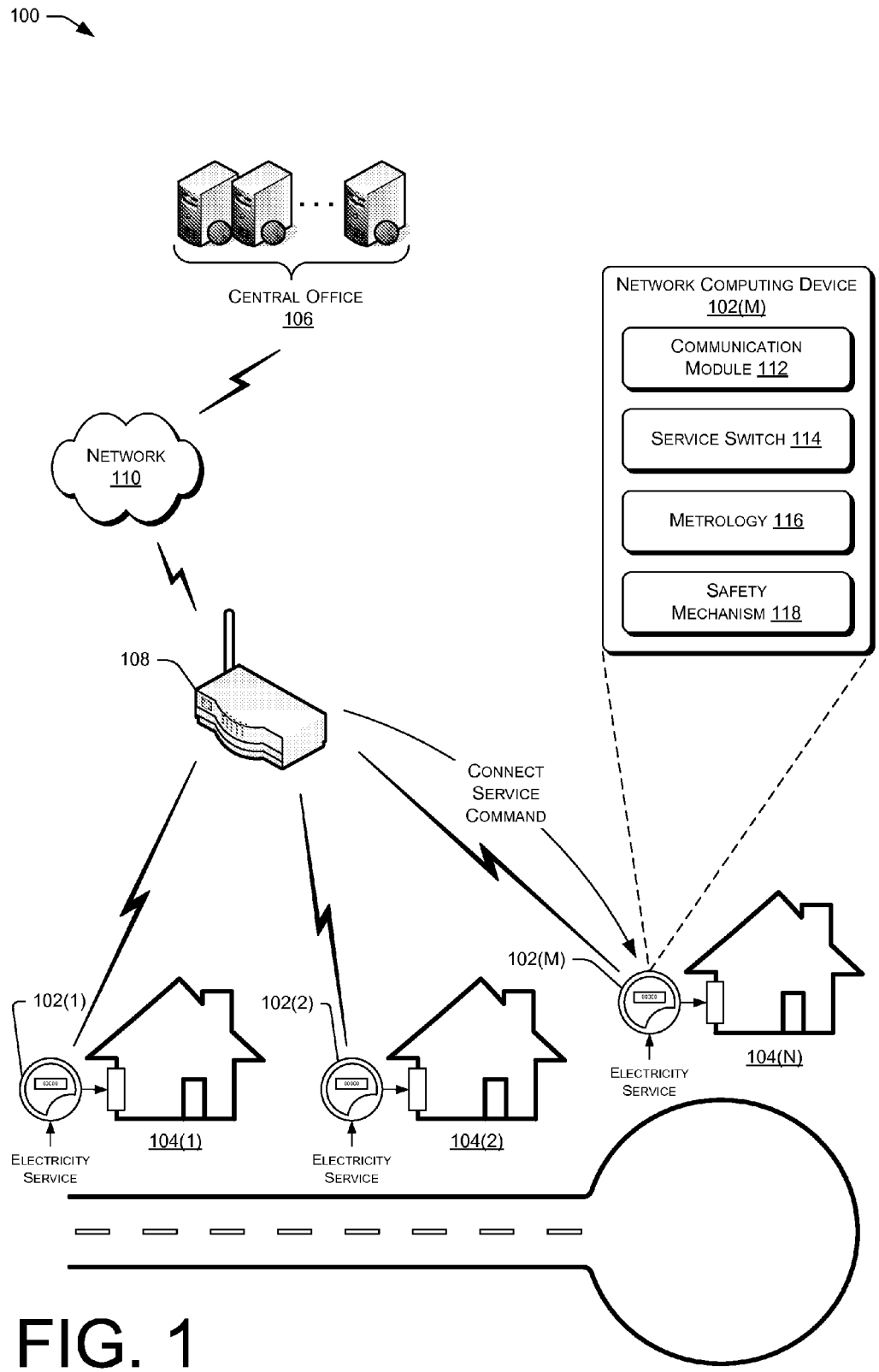
FIG. 1 is a schematic diagram of an example architecture which is usable to safely remotely connect and disconnect electricity service to a site, without requiring a person to access an electricity meter at the site.

As discussed above, there has not previously been a way for utility companies to safely remotely reconnect electricity service to the site at which an electricity meter is not readily accessible to residents or personnel at the site.

This application describes techniques for safely remotely connecting and disconnecting electricity service to a site, even when an electricity meter or other network computing device is not accessible at the site. By way of example, these techniques may be applicable when an electricity meter is located up a utility pole, is located under or behind a protective cover or housing, is disposed in a locked cabinet or closet, or is otherwise inaccessible to residents or other personnel at the site. As used herein, a "site" means a residence, a business, or any other location to which electricity service is provided.

The techniques described herein for safely remotely connecting and disconnecting electricity service to a site may be implemented by a network computing device, such as, for example, an electricity meter, intelligent sensor, transformer, control point, or any other device responsible for connecting or disconnecting electricity service to a site. In general, network computing devices according to this disclosure may include a service switch capable of connecting electricity service to a site, a communication module capable of receiving commands to connect or disconnect electricity service, and a safety mechanism to monitor a circuit internal to the site and to prevent the service switch from connecting electricity service to the site while a potentially unsafe condition is detected. Generally, the circuit internal to the site represents the total service into the site (e.g., all of the electricity wiring within the site). However, in other examples, the safety mechanism may be configured to monitor one or more circuits constituting less than all of the circuits or wiring internal to the site (e.g., only one sub-breaker within the site).

One example of a potentially unsafe condition that may cause the safety mechanism to prevent electricity service from being reconnected is a condition in which a main electricity breaker of the site is closed (i.e., on) and a load is detected on the circuit. In such an example, the load may represent an appliance, such as a stove, that if power were restored could result in a fire or other unsafe condition. If such a condition is detected, the utility company may contact the resident or other personnel at the site and inform them to unplug or turn off all appliances and then open (i.e., turn off) the main breaker at the site in order to restore electricity service to the site. Once the main breaker at the site is open and/or all loads are removed from the circuit internal to the site, the network communication device may automatically connect/reconnect electricity service. Alternatively, the utility company may require someone at the site to inform the utility (e.g., by telephone, email, text message, web interface, etc.) that the main breaker at the site is open and/or all loads are removed from the circuit internal to the site before connecting/reconnecting electricity service to the site.

Multiple and varied example implementations and embodiments are described below. However, these examples are merely illustrative, and other implementations and embodiments may be used to safely remotely connect and disconnect electricity service to a site, even when an electricity meter or other network computing device is not accessible at the site without departing from the scope of the claims.

Example Architecture

FIG. 1 is a schematic diagram of an example architecture 100 of a utility communication network which is usable to safely remotely connect and disconnect electricity service to a site, without requiring a person to access an electricity meter at the respective site. The architecture 100 includes a plurality of network communication devices 102(1), 102(2), ... 102(M) (collectively referred to as network communication devices 102) associated with a plurality of sites 104(1), 104(2), ... 104(N) (collectively referred to as sites 104). In this example, M represents a number of network communication devices in a utility communication network. The utility communication network may include one or a combination of a wide area network (WAN), metropolitan area network (MAN), local area network (LAN), neighborhood area network (NAN), home area network (HAN), personal area network (PAN), or the like.

Each of the network communication devices 102 may be implemented as any of a variety of conventional computing devices such as, for example, smart utility meters (e.g., electric, gas, and/or water meters), sensors (e.g., temperature sensors, weather stations, frequency sensors, etc.), control devices, transformers, switches, combinations of the foregoing, or the like. The architecture 100 may represent a heterogeneous network of network communication devices, in that the network communication devices 102 may include different types of network communication devices (e.g., smart meters, cellular relays, sensors, etc.), different generations or models of network communication devices, and/or network communication devices that otherwise are capable of transmitting on different channels and using different modulation techniques, data rates, protocols, signal strengths, and/or power levels.

In this example, the network communication devices 102 are also configured to communicate with a central office 106 via an edge device 108 (e.g., data collector, cellular relay, cellular router, edge router, DODAG root, etc.) which serves as a connection point to a backhaul network(s) 110, such as the Internet. The utility communication network may be configured as a "star network" in which the network communication devices 102 communicate directly with a data collector (as shown), or as a "mesh network" in which the network communication devices 102 communicate with an edge device directly or via one or more intervening upstream devices. The architecture of FIG. 1 is generically representative of either a star network or a mesh network.

The network communication device 102(M) is representative of each of the network communication devices 102 and includes a communication module 112 usable to communicate with the edge device 108 and/or one or more other network communication devices 102. The communication module 112 may include hardware and/or software components to enable one or multiple different modes of communication. For instance, the communication module may comprise a radio frequency (RF) transceiver configured to transmit and/or receive RF signals via one or more of a plurality of channels/frequencies. The radio may comprise an RF front end and a baseband processor or software defined radio. In some implementations, each of the network communication devices 102 includes a single radio configured to send and receive data on multiple different channels, such as the control channel and multiple data channels of each communication link. The radio may also be configured to implement a plurality of different modulation techniques, data rates, protocols, signal strengths, and/or power levels. Additionally or alternatively, the communication module 112 may include a power line communication (PLC) module, a cellular or wide area network (WAN) module, or other communication software and/or hardware to facilitate communication with other devices in the utility communication network.

The network communication device 102(M) also includes a service switch 114 usable to connect, disconnect, and/or reconnect service to a residence, business, or other site 104. In other implementations the service switch 114 may be a separate device or module communicatively coupled to the network communication device 102. In the case of an electricity meter or other device including metering functionality, the network communication device 102 may also include metrology 116 to sense and measure electricity consumption at the site. The metrology 116 is representative of any of a variety of hardware and/or software usable to sense and measure electricity consumption data of the site. The network computing device 102(M) also includes a safety mechanism 118 to monitor a circuit internal to the site and to prevent the service switch 114 from connecting/reconnecting electricity service to the site while a potentially unsafe condition is detected.

In the illustrated example, the communication module 112 of network computing device 102(M) receives a "connect service command" from the central office 106 via the edge device 108. The connect service command instructs the network computing device 102(M) to connect or reconnect electricity service to the site 104(N). The safety mechanism 118 of network computing device 102(M) monitors a circuit internal to the site to detect whether a potentially unsafe condition is present in the circuit internal to the site. The safety mechanism 118 of network computing device 102(M) may monitor the circuit internal to the site in response to receiving the connect service command. Alternatively, the safety mechanism 118 may monitor the circuit internal to the site periodically or continuously prior to receiving the connect service command. In either case, the safety mechanism 118 determines whether or not to connect electricity service to the site based at least in part on whether the condition was detected to be present during the monitoring.

If the safety mechanism 118 determines that no potentially unsafe conditions exist, the safety mechanism 118 may allow and/or instruct the service switch to connect/reconnect electricity service to the site. In some examples, the network computing device 102(M) may notify the central office 106 when service has been connected/reconnected to the site 104 (N). The metrology 116 of the network communication device 102(M) may then begin collecting electricity consumption data of the site and the communication module 112 may report the electricity consumption data to the central office 106 via the edge device 108 and the network 110.

If a potentially unsafe condition is detected, the safety mechanism 118 prevents the service switch 114 from connecting/reconnecting power to the site. As mentioned above, examples of potentially unsafe conditions include detecting that the main breaker to the site is closed and/or detecting a load on the circuit internal to the site. Thereafter, the safety mechanism 118 may periodically or continuously monitor the circuit internal to the site. If/when the potentially unsafe condition no longer exists (e.g., the main breaker is opened and/or all loads are removed from the circuit), the safety mechanism 118 may allow and/or instruct the service switch to connect/reconnect electricity service to the site.

Example Network Communication Device

Figure 2:
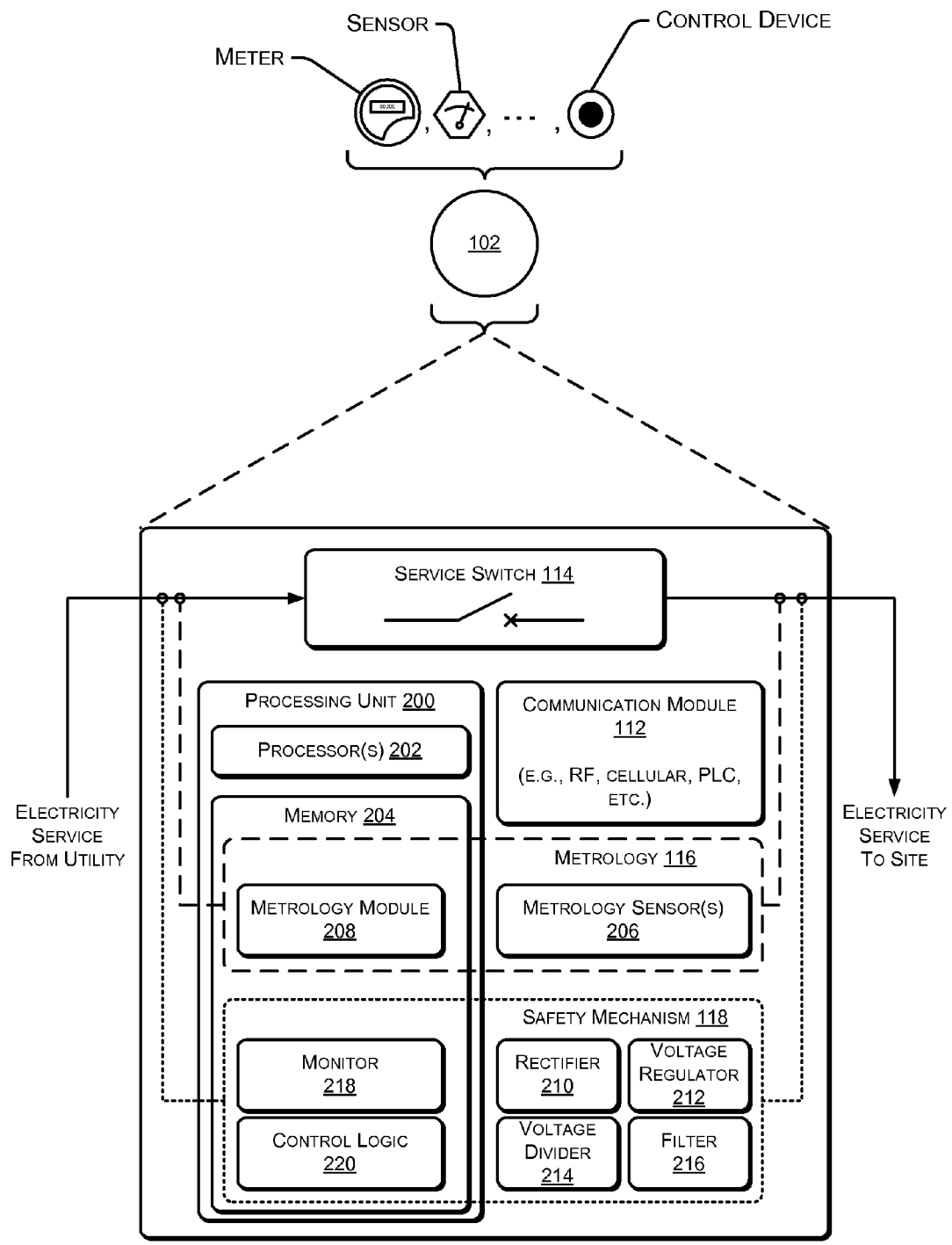
FIG. 2 is a schematic diagram showing details of an example network computing device, such as a meter, that can be used to safely remotely connect and disconnect electricity service to a site.

FIG. 2 illustrates additional details of an example network communication device 102, such as the network communication device 102(M) of FIG. 1. As shown in this figure, the network communication device 102 of this example includes a processing unit 200 comprising one or more processors 202 communicatively coupled to memory 204. The processor(s) 202 in this example are representative of one or more microprocessors, microcontrollers, or other processing devices configured to execute software and/or firmware modules stored in the memory 204. The memory 204 is an example of computer-readable media and may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier waves.

The memory 204 may be configured to store one or more software and/or firmware modules, which are executable on the processor(s) 202 to implement various functions. For instance, the metrology 116 may include one or more metrology sensors 206 (e.g., hall sensors, shunts, etc.) and associate integrated circuits to process and condition the sensed electricity consumption data for transmission to a metrology module 208 stored in memory 204 and executable by the processor(s) 202. The metrology module 208 may also include one or more libraries or data stores for storage of metrology data. The subcomponents of the metrology 116 are shown in this figure bounded by a dashed line. As shown in FIG. 2, the metrology 116 is connected across the service switch 114, such that the metrology is able to measure electricity consumption when the services switch 114 is closed.

Safety mechanism 118 includes a rectifier 210 to convert alternating current (AC) available from the electricity service from the utility into direct current (DC). By using DC instead of AC, the safety mechanism is not susceptible to interference caused by AC coupling (e.g., inductive coupling and/or capacitive coupling) from nearby wires or power lines. The safety mechanism 118 also includes a voltage regulator 212 to regulate the DC to a voltage usable for monitoring the circuit internal to the site. The voltage regulator 212 is configured to provide a DC voltage for monitoring purposes that is relatively low so as not to cause potential harm to individuals working on the circuit internal to the site, and to avoid damage to any appliances or other loads that may be connected to the circuit internal to the site. In some examples, the safety mechanism 118 may also include a voltage divider 214 to divide the voltage down to a value suitable for input to the processor(s) 202 and/or a filter 216 to filter out noise from the signal due to, for example, capacitive coupling of nearby parallel wires or devices. The voltage divider 214 and filter 216 help to condition the monitoring signal for output to a monitor 218 which is stored in the memory 204 and executing on the processor(s) 202. Specifically, the voltage divider 214 reduces the voltage to a level that is readable by an analog to digital (AD) converter, processor(s) 202, or other monitoring device. The filter 216 filters the divided voltage to remove noise (e.g., due to AC coupling) for more precise measurements. However, in other embodiments, the voltage divider 214 and/or filter 216 may be modified or omitted entirely. The monitor 218 monitors an output of the circuit and compares a resultant voltage to a reference or ground voltage. The resultant voltage is representative of an impedance of the circuit internal to the house. That is, a high resultant voltage relative to the reference voltage is representative of a impedance, suggesting that the main breaker of the circuit is open and that no loads are connected to the circuit. A low or zero resultant voltage relative to the applied DC voltage infinities representative of a low impedance, suggesting that the main breaker is closed and that one or more loads are attached to the circuit.

In some embodiments, the monitor 218 may compare the resultant voltage to a threshold voltage. If the resultant voltage is above the threshold voltage, the monitor 218 detects that it is safe to connect electricity to the circuit (i.e., the breaker is open and/or there are no loads on the circuit). If the resultant voltage is below the threshold, the monitor 218 detects a potentially unsafe condition and the control logic 220 prevents the service switch 114 from connecting/reconnecting electricity service to the site.

In other embodiments, the monitor 218 may use the resultant voltage to compute a resultant impedance of the circuit. A high resultant voltage will result in a high resultant impedance. The monitor 218 then compares the resultant impedance to a threshold impedance. If the resultant impedance is above the threshold impedance, the monitor 218 determines that no potentially unsafe conditions are present and the control logic 220 allows or instructs the service switch 114 to connect/reconnect electricity service to the site. If the resultant impedance is below the threshold impedance, the monitor 218 detects a potentially unsafe condition and the control logic 220 prevents the service switch 114 from connecting/reconnecting electricity service to the site. Since the safety mechanism 118 is coupled across the services switch 114, the safety mechanism 118 is able to monitor the circuit internal to the site even when the electricity service is disconnected. The subcomponents of the safety mechanism 118 are shown in this figure bounded by a dotted line.

Once electricity service is connected/reconnected, the communication module 112 may report the connection to the central office 106 and/or begin transmitting electricity consumption data measured by the metrology 116. While not shown in this figure, the communication module 112 may include one or more software or firmware components (e.g., software defined radio, drivers, libraries, applications, plugins, etc.) stored in memory 204 and executable or accessible by the processor(s) 202. Additionally, in some embodiments the communication module 112 may include one or more of its own dedicated processor and/or memory.

While certain functions and modules are described herein as being implemented by software and/or firmware executable on a processor, in other embodiments, any or all of the modules may be implemented in whole or in part by hardware (e.g., as an ASIC, a specialized processing unit, etc.) to execute the described functions.

Example Safety Mechanism

Figure 3:
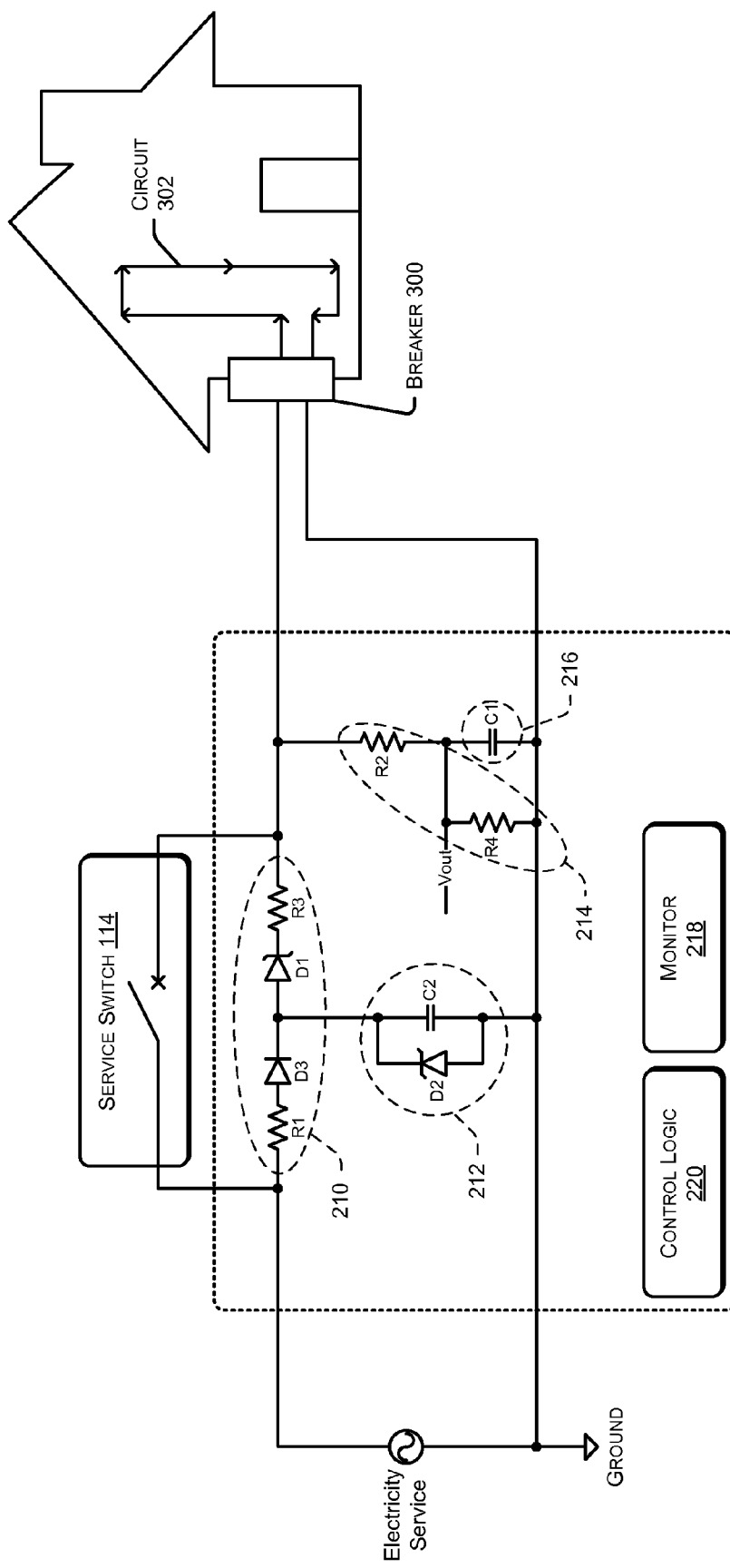
FIG. 3 is schematic diagram showing details of an example safety mechanism of the network computing device of FIG. 2, which is configured to prevent electricity service from being reconnected to a site when an potentially unsafe condition exists.

FIG. 3 illustrates additional details of an example safety mechanism, such as the safety mechanism 118 of FIGS. 1 and 2. The details of the safety mechanism 118 shown in FIG. 3 correspond to an example in which the safety mechanism 118 is applied to a single phase of electricity service and in a network computing device having a ground. For network computing devices that include an internal ground, the same example safety mechanism may be adapted to apply to multiple phase electricity service by simply replicating the circuit components of the safety mechanism for each phase of electricity service. Further, the safety mechanism of this figure could also be adapted for use with multiple phase electricity service and in network computing devices without an internal ground, by applying the DC voltage to each phase and/or between phases and including an alternate reference voltage in the meter. The monitor 218 and control logic 220 portions of the safety mechanism 118 may be used to support single phase and multiple phase electricity service in network communication devices with or without an internal ground.

In the example shown in FIG. 3, the safety mechanism 118 generally corresponds to the elements within the dotted line boundary. As discussed with reference to FIG. 2, the safety mechanism 118 may include a rectifier 210, a voltage regulator 212, a voltage divider 214, and/or a filter 216, which are generally located within the respective regions bounded by dashed lines. Specifically, in the illustrated embodiment, the rectifier 210 comprises diode D3 and zener diode D1. In the illustrated example, rectifier 210 also includes resistors R1 and R3, which allow a small amount of current to bypass the service switch 114 and become rectified by diode D3 and zener diode D1. Resistors R1 and R3 also help to limit the voltage in the circuit internal to the house to a safe level when the service switch is open. Thus, while resistors R1 and R3 do not themselves rectify the current, they are shown as part of the rectifier 210 since they regulate an amount of current that is rectified by diode D3 and zener diode D1. The voltage regulator 212 comprises zener diode D2 that regulates the DC voltage and capacitor C2 that stores the DC charge so that it is maintained through the negative swing of the input line voltage. The voltage divider 214 comprises resistors R2 and R4, and the filter comprises capacitor C1. However, in other examples, the rectifier 210, voltage regulator 212, voltage divider 214, and/or filter 216 may be composed of different components. For example, while R1, R2, and R3 are shown as single individual resistors, in other examples R1, R2, and R3 may each represent a string of resistors that collectively provide the desired resistive value(s). Moreover, the specific values of individual components may vary depending on the desired performance.

The monitor 218 measures the resultant voltage at Vout and compares it to a reference voltage or ground to determine whether a potentially unsafe condition exists. Additionally or alternatively, monitor 218 may compares a resultant impedance to a threshold impedance to determine whether a potentially unsafe condition exists. If so, the control logic 220 prevents the service switch 114 from connecting/reconnecting electricity service to the site. If not, the control logic 220 allows or instructs the service switch 114 to connect/reconnect electricity service to the site.

FIG. 3 also illustrates in more detail how the safety mechanism 118 is connected across a breaker 300 to a circuit 302 internal to the site. Thus, by monitoring an impedance of the circuit 302 internal to the site, the safety mechanism 118 will be able to detect potentially unsafe conditions, such as the breaker 300 being closed and one or more loads on the circuit 302. As mentioned above, the specific design of the safety mechanism shown in FIG. 3 is just one example and numerous other safety mechanism configurations are also possible within the scope of this disclosure.

Example Method of Connecting/Disconnecting Electricity Service

Figure 4:
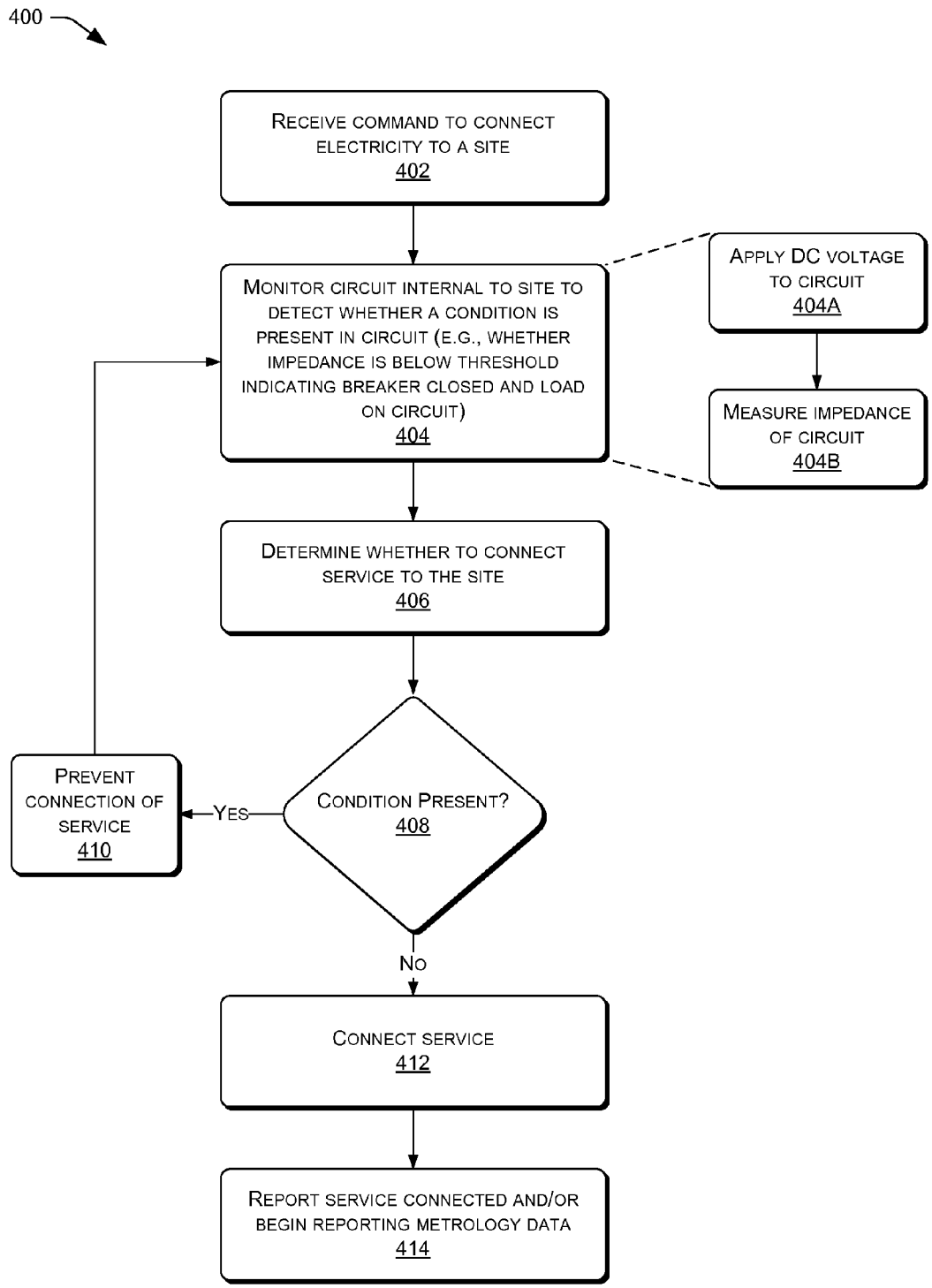
FIG. 4 is a flowchart illustrating an example method usable to safely remotely connect and disconnect electricity service to a site.

FIG. 4 illustrates an example method 400 of connecting or disconnecting electricity service to a site. The method 400 is described with reference to the example architecture 100 and network communication device 102 of FIGS. 1-3 for convenience. However, the method 400 is not limited to use with the example architecture 100 and network communication device 102 and may be implemented using other architectures and devices.

According to method 400, at block 402, a network communication device, such as network communication device 102M, receives a command from a central office to connect electricity service to a site, such as site 104(N). The command may be received by a communication module of the network communication device as an RF communication, a PLC communication, a cellular communication, or any other communication format that the device is capable of receiving.

At block 404, a safety mechanism (e.g., safety mechanism 118) of the network communication device monitors a circuit internal to the site to detect whether a potentially unsafe condition is present in the circuit internal to the site. In one example, the safety mechanism may monitor the circuit internal to the site by applying a DC voltage to the circuit, at block 404A, and measuring a resultant voltage and/or impedance of the circuit, at block 404B. The safety mechanism may monitor the circuit internal to the site in response to receiving the connect service command. Alternatively, the safety mechanism may monitor the circuit internal to the site periodically or continuously prior to receiving the command to connect service. In either case, at block 406, the safety mechanism determines whether or not to connect electricity service to the site based at least in part on whether the condition was detected to be present during the monitoring.

In one example, the monitor of the safety mechanism may determine whether an unsafe condition is present by comparing the resultant voltage to a threshold voltage and/or comparing a resultant impedance to a threshold impedance. If the resultant voltage and/or impedance is below the threshold impedance, at block 408 the monitor determines that "YES" a potentially unsafe condition and, at block 410, control logic prevents the service switch from connecting/reconnecting electricity service to the site. The process then proceeds back to block 404 where the safety mechanism continues to monitor the circuit internal to the site until the potentially unsafe condition is no longer present (e.g., the main breaker of the site is opened and/or all loads are removed from the circuit).

If the resultant voltage and/or impedance is above the threshold impedance, at block 408 the monitor determines that "NO" potentially unsafe conditions are present and the control logic allows or instructs the service switch to connect/reconnect electricity service to the site. At block 412, the service switch connects/reconnects service to the site. In some implementations, the network communication device may automatically connect/reconnect electricity service when the potentially unsafe condition is no longer detected. However, in other implementations, the network communication device may not connect/reconnect service until a subsequent command to connect service is received after the potentially unsafe condition is no longer detected.

At block 414, the network computing device may report the successful connection/reconnection of service and/or may begin reporting electricity consumption data collected by the metrology of the network communication device.

The method 400 is illustrated as a collection of blocks and/or arrows in a logical flowchart representing a sequence of operations that can be implemented in hardware, software, firmware, or a combination thereof. The order in which the blocks are described is not intended to be construed as a limitation, and any number of the described operations can be combined in any order to implement the method, or alternate methods. Additionally, individual operations may be omitted from the method without departing from the spirit and scope of the subject matter described herein. In the context of software, the blocks represent computer instructions stored in memory or computer-readable media that, when executed by one or more processors, configure the processor to perform the recited operations. In the context of hardware, the blocks may represent one or more circuits (e.g., application specific integrated circuits—ASICS, field programmable gate arrays—FPGAs, etc.) configured to execute the recited operations.

Conclusion

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
receiving, at a network computing device, a command to connect electricity service to a subscriber side of a service switch;
monitoring a circuit internal to the subscriber side of the service switch to detect whether a condition is present in the circuit internal to the subscriber side of the service switch, wherein monitoring the circuit internal to the subscriber side of the service switch comprises:
applying a direct current (DC) voltage from a utility service side of the service switch to the circuit internal to the subscriber side of the service switch; and
measuring a resultant voltage or a resultant impedance of the circuit internal to the subscriber side of the service switch when the DC voltage is applied; and
determining whether or not to connect electricity service to the subscriber side of the service switch based at least in part on whether the condition was detected to be present during the monitoring.

2. The method of claim 1, further comprising connecting, via a service switch of the network computing device, the electricity service to the subscriber side of the service switch responsive to detecting that the condition is not present in the circuit internal to the subscriber side of the service switch.

3. The method of claim 2, further comprising, after connecting electricity service to the subscriber side of the service switch:
collecting metrology data indicating consumption of electricity by the subscriber side of the service switch; and
reporting the metrology data to a central office of a provider of the electricity service.

4. The method of claim 1, further comprising preventing the electricity service from being connected to the subscriber side of the service switch responsive to detecting that the condition is present in the circuit internal to the subscriber side of the service switch.

5. The method of claim 4, further comprising connecting the electricity service to the subscriber side of the service switch responsive to detecting that the condition is no longer present in the circuit internal to the subscriber side of the service switch.

6. The method of claim 1, wherein the condition for which the monitoring is configured to detect comprises a main electricity breaker of the subscriber side of the service switch being closed.

7. The method of claim 1, wherein the condition for which the monitoring is configured to detect comprises a main electricity breaker of the subscriber side of the service switch being closed and a load being detected on the circuit internal to the subscriber side of the service switch.

8. The method of claim 1, wherein detecting that the condition is present comprises detecting that the resultant voltage is below a threshold voltage and/or the resultant impedance is below a threshold impedance.

9. The method of claim 1, wherein monitoring the circuit internal to the site further comprises using a rectifier to convert alternating current (AC) supplied to an exterior of the site into direct current (DC) to be applied to the circuit internal to the subscriber side of the service switch.

10. A network computing device comprising:
a communication module to receive communications;
a service switch configured to selectively connect or disconnect electricity service to a subscriber side of the service switch responsive to commands received by the communication module; and
a safety mechanism configured to monitor a circuit internal to the subscriber side of the service switch to detect a condition of the circuit, and to prevent the service switch from connecting electricity service to the subscriber side of the service switch while the condition is detected, wherein the safety mechanism comprises:
a rectifier to convert alternating current (AC) supplied to an exterior of the site into direct current (DC) to be applied to the circuit internal to the subscriber side of the service switch; and
a monitor to detect a resultant voltage and/or a resultant impedance of the circuit internal to the site when the DC is being applied.

11. The network computing device of claim 10, wherein the network computing device comprises an electricity meter and includes metrology to measure electricity usage at the subscriber side of the service switch.

12. The network computing device of claim 10, wherein the condition comprises a main electricity breaker of the subscriber side of the service switch being closed.

13. The network computing device of claim 10, wherein the condition comprises a main electricity breaker of the subscriber side of the service switch being closed and a load being detected on the circuit.

14. The network computing device of claim 10, wherein the safety mechanism is configured to detect the condition when the resultant voltage is below a threshold voltage and/or a resultant impedance is below a threshold impedance.

15. The network computing device of claim 10, wherein the safety mechanism comprises:
a voltage regulator to regulate a voltage of the DC to be applied to the circuit internal to the subscriber side of the service switch; and
control logic to prevent the service switch from connecting electricity service to the subscriber side of the service switch when the monitor detects that the resultant voltage of the circuit is below a threshold voltage and/or the resultant impedance of the circuit is below a threshold impedance.

16. The network computing device of claim 15, wherein the safety mechanism further comprises a voltage divider and a filter to condition a signal supplied to the monitor.

17. The network computing device of claim 10, wherein the safety mechanism is unsusceptible to interference from capacitive and/or inductive coupling of alternating current (AC) voltages and currents from nearby electrical wires.

18. The network computing device of claim 10, further comprising a metrology module stored in memory of the network computing device.

19. The network computing device of claim 18, wherein the metrology module includes one or more libraries or data stores to store metrology data.

20. An electricity meter comprising:
a service switch configured to selectively connect or disconnect electricity service to a subscriber side of the service switch;
metrology to measure electricity usage at the subscriber side of the service switch; and
a safety mechanism configured to monitor a circuit internal to the subscriber side of the service switch to:
detect a potentially unsafe condition in which a main electricity breaker of the subscriber side of the service switch is closed and a load is detected on the circuit, and prevent the service switch from connecting electricity service to the subscriber side of the service switch while the potentially unsafe condition is detected;

wherein the safety mechanism comprises:
  a rectifier to convert alternating current (AC) supplied to an exterior of the site into direct current (DC) to be applied to the circuit internal to the subscriber side of the service switch; and
  a monitor to detect a resultant voltage and/or a resultant impedance of the circuit internal to the site when the DC is being applied.

* * * * *